Figure 1:
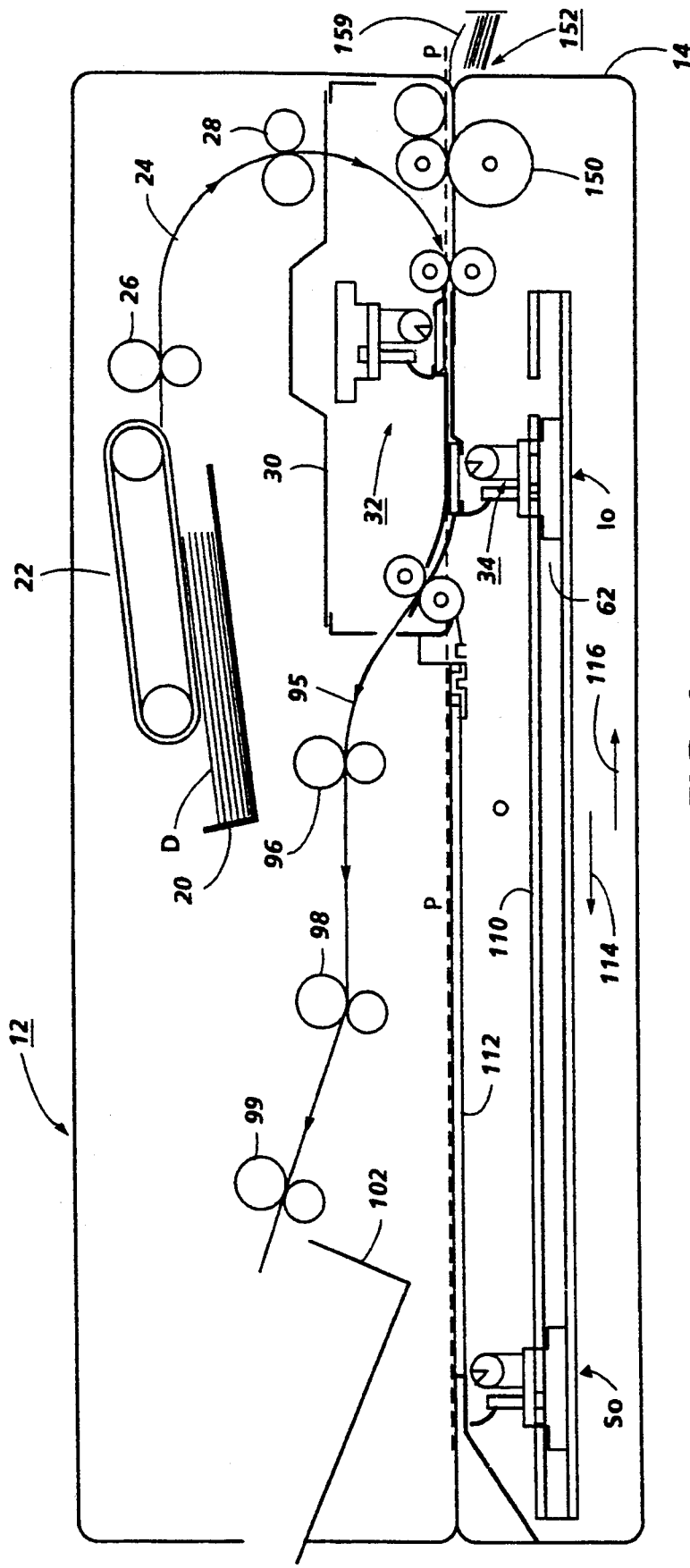

United States Patent [19]

Fullerton

[11] Patent Number: 5,280,368
[45] Date of Patent: Jan. 18, 1994

[54] FIXED FULL WIDTH ARRAY SCAN HEAD CALIBRATION APPARATUS

[75] Inventor: Jack K. Fullerton, Webster, N.Y.

[73] Assignee: Xerox Corporation, Stamford, Conn.

[21] Appl. No.: 971,004

[22] Filed: Nov. 2, 1992

[51] Int. Cl.$^5$ .................... H04N 1/04; G03G 15/28
[52] U.S. Cl. ...................... 358/474; 358/497; 358/496; 355/235; 355/233
[58] Field of Search ............ 358/474, 496, 497, 498, 358/461; 355/203, 233, 235

[56] References Cited

U.S. PATENT DOCUMENTS

| | | | |
|---|---|---|---|
| 4,261,661 | 4/1981 | Thiers | 355/24 |
| 4,422,100 | 12/1983 | DuVall et al. | 358/497 |
| 4,429,333 | 1/1984 | Davis et al. | 358/293 |
| 4,464,681 | 8/1984 | Jacobs et al. | 358/285 |
| 4,475,128 | 10/1984 | Koumura | 358/296 |
| 4,500,195 | 2/1985 | Hosono | 355/3 R |
| 4,536,077 | 8/1985 | Stoffel | 355/8 |
| 4,538,896 | 9/1985 | Tajima et al. | 355/3 R |
| 4,562,485 | 12/1985 | Maeshima | 358/280 |
| 4,563,706 | 1/1986 | Nagashima | 358/280 |
| 4,571,636 | 2/1986 | Itoh | 358/285 |
| 4,574,316 | 3/1986 | Wilman et al. | 358/285 |
| 4,588,280 | 5/1986 | Ogawa et al. | 355/3 R |
| 4,604,161 | 8/1986 | Araghi | 156/645 |
| 4,605,970 | 8/1986 | Hawkins | 358/265 |
| 4,607,941 | 8/1986 | Honda | 355/3 R |
| 4,706,125 | 11/1987 | Takagi | 358/256 |
| 4,743,974 | 5/1988 | Lockwood | 358/296 |
| 4,806,977 | 2/1989 | Mizutani et al. | 355/8 |
| 4,839,730 | 6/1989 | Shirakoshi et al. | 358/294 |
| 4,967,233 | 10/1990 | Buchar et al. | 355/233 |
| 4,970,606 | 11/1990 | Shima | 358/474 |
| 4,975,787 | 12/1990 | Ijuin et al. | 358/461 |
| 5,101,284 | 3/1992 | Tanabe | 358/461 |
| 5,136,665 | 8/1992 | Inoue | 358/496 |

FOREIGN PATENT DOCUMENTS 62-1369  3/1987  Japan .
62-51368 3/1987  Japan .
62-51370 3/1987  Japan .

OTHER PUBLICATIONS

R. E. Smith, "Automatic Duplex Document Electronic Scanning"; May/Jun., vol. 8, No. 3, 1983, p. 263.

Primary Examiner—Edward L. Coles, Sr.
Assistant Examiner—Kimberly A. Williams
Attorney, Agent, or Firm—Mark Costello

[57] ABSTRACT

An input scanner provided with a document input, a sheet feeding path for transporting documents to a scanning station and to a document output; a scanning station having a first scanning element, fixed in position relative to the sheet feeding path, and a second scanning element, arranged at a home position for substantially simultaneous duplex scanning of sheets fed along the sheet feeding path, and which is also supported for movement past a scanning platen, each scanning element supporting a full width array of photosensitive sensors with a corresponding optical arrangement for directing light from the document to the sensors, there is provided a dual purpose calibration/baffle member, which in a first position serves as a paper baffle along the sheet feeding path to the scanning station to support sheets at the first scanning element, and in a second position, supports a calibration target at a position for detection by the first scanning element. The calibration/baffle member is mounted on the input scanner frame for movement between the first and second positions, and is provided with a bias arrangement which biases the calibration/baffle member for document scanning operation to the first position. The calibration/baffle member is arranged in the path of movement of the second scanning element, for engagement therewith to move the calibration/baffle member to the second position.

3 Claims, 2 Drawing Sheets

FIXED FULL WIDTH ARRAY SCAN HEAD CALIBRATION APPARATUS

This invention relates generally to raster input scanners for acquisition of image information, and more particularly to a raster input scanner having a fixed position scan head, and an arrangement for providing a calibration pattern therefor.

BACKGROUND OF THE INVENTION

Acquisition of information adaptable for electronic processing applications directly from printed original documents has become greatly desirable as an adjunct to electronic document production. An important reason for its desirability is the subsequent capability of manipulation of the electronically stored information for editing, compiling and using the information in forms other than that in which it was originally available. While such manipulation is, of course, available for image information produced originally and available in an electronic format, it is desirable to have a similar capability for image information not so available. Accordingly, it is desirable to have an image information input capability for such information. In addition to the production of new documents from electronically stored information, it will also be appreciated that some copying functions available in light lens-type copiers, copying images directly from original documents, may be more readily accomplished if image information is available electronically. Thus, with the capability of electronic input of information, coupled with available output devices, functions such as duplex copying, image rotation, cropping, editing, etc, are possible without the requirement of difficult mechanical manipulation of originals and copies.

It has become desirable to provide arrangements allowing faster document handling, particularly adapted to these applications of input scanners. It is desirable to provide a scanning device for scanning duplex documents, i.e., original documents having image information on both sides, for simplex documents having image information only on a single side, and for material not adaptable to be passed through sheet handling devices. U.S. Pat. No. 4,743,974 to Lockwood and U.S. Pat. No. 4,967,233 to Buchar suggests a scanner provided with a pair of scan elements arranged in opposition for substantially simultaneous duplex scanning of documents moving though a scanning station, and providing for movement of one of the scan elements for a platen scanning arrangement. The problem of duplex scanning has also been approached in input scanners in a variety of ways, including the arrangements shown in U.S. Pat. No. 4,536,077 to Stoffel; Xerox Disclosure Journal, Vol. 8, No. 3, May/June, 1983, entitled "Automatic Duplex Document Electronic Scanning" by Richard E. Smith, page 263; U.S. Pat. No. 4,429,333 to Davis et al.; U.S. Pat. No. 4,571,636 to Itoh; U.S. Pat. No. 4,261,661 to Thiers; U.S. Pat. No. 4,563,706 to Nagashima; U.S. Pat. No. 4,562,485 to Maeshima; U.S. Pat. No. 4,839,730 to Shirakoshi et al.; U.S. Pat. No. 4,475,128 to Koumura; and Japanese Laid Open Patent Applications 62-51368, 62-51369, and 62-51370.

A primary problem associated with electronic input scanners is a periodic requirement for calibration of the sensor arrangement. Because a large number of photosensitive elements make up the scanning array, uniformity of response is necessary for good imaging quality. However, varying electronic characteristics of the sensors, aging illumination sources, and varying mechanical tolerances within a scanning device all contribute to variations in the light intensity response of the sensors in the device. Frequent calibration is required against a target having a known reflectance value.

In the Xerox Docutech Publishing System, a moving scanner for scanning stationary documents is controlled to move past and scan a test target arranged immediately adjacent to a stationary document platen, and in the scanning path. Such a calibration system provides a required relative movement of target and sensor, and could be implemented in a scanner built in accordance with Lockwood and other arrangements which provided a moving scan head, or an optical arrangement that provides relative movement of the image past the scan head. However, the Docutech Publishing System calibration arrangement would not be satisfactory to calibrate the fixed scan head in the Lockwood arrangement, as there is no way to direct the calibration target image to the fixed scan head.

U.S. Pat. No. 4,574,316 to Wilman et al. discloses a document scanner unit which rotates into at least one other scanning position to receive light reflected from a remote source. U.S. Pat. No. 4,464,681 to Jacobs et al. suggests an optical scanning system comprising a linear photodiode array which can be adjusted in position to view an optical test pattern. U.S. Pat. No. 4,605,970 to Hawkins discloses a calibration arrangement which moves an optical scanning head assembly from a reference location into a testing position to view an optical test pattern. U.S. Pat. No. 4,706,125 to Takagi discloses an image reading device comprising an integrated image reading unit and an optical sensitivity checking member which concurrently translate in unison from an inoperative position into an operative position during the scanning of an original. In somewhat analogous light lens copying devices, U.S. Pat. No. 4,806,977 to Mizutani et al. discloses a movable carriage housing for a scanning-type optic apparatus wherein a rack and pinion arrangement allows an upper body portion apparatus to pivot outwardly to expose a transfer station and scanning head for maintenance. U.S. Pat. No. 4,607,941 to Honda discloses an image forming apparatus containing an interchangeable process unit mounted onto a housing, which can be serviced by sliding the unit along a set of securing rails. U.S. Pat. No. 4,538,896 to Tajima et al., U.S. Pat. No. 4,500,195 to Hosono, and U.S. Pat. No. 4,588,280 to Ogawa et al. disclose electrostatic copying machines having units which rotate about a pivotal axis to expose an imaging system for maintenance and repair. U.S. Pat. No. 4,967,233 to Buchar et al. teach rotation of the scan head assembly from its operational position to a calibration position, with a motor drive arrangement.

It has been found somewhat undesirable to use a calibration target on a sheet provided to the user to run through the scanning device to scan for calibration purposes. The sheets tend to degrade in image quality. Imperfect copies of the sheets may be used. The process is not automatic and thus requires operator intervention to feed the sheet. All these elements make a separate sheet of paper an undesirable calibration target. Accordingly, a target integral with the scanning arrangement is desirable.

All the patents and publications cited hereinabove are incorporated herein by reference.

SUMMARY OF THE INVENTION

In accordance with the invention in an electronic input scanner having a fixed scan head supporting a full width array of sensors for scanning documents directed therepast, there is provided an arrangement for providing a calibration target for normalizing sensor response across the array.

In accordance with the invention, in an input scanner provided with a document input, a sheet feeding path for transporting documents to a scanning station and to a document output; a scanning station having a first scanning element, fixed in position relative to the sheet feeding path and a second scanning element, arranged at a home position or substantially simultaneous duplex scanning of sheets fed along the sheet feeding path, and which is also supported for movement past a scanning platen, each scanning element supporting a full width array of photosensitive sensors with a corresponding optical arrangement for directing light from the document to the sensors, there is provided a dual purpose calibration/baffle member, which in a first position serves as a paper baffle along the sheet feeding path to the scanning station, and in a second position, supports a calibration target at a position for detection by the first scanning element.

In accordance with another aspect of the invention, the calibration/baffle member is mounted on the input scanner frame for movement between the first and second positions, and is provided with a bias arrangement which biases the calibration/baffle member to the first position. The calibration/baffle member is arranged in the path of movement of the second scanning element, for engagement therewith to move the calibration/baffle member to the second position.

The calibration/baffle member as a paper baffle is useful in the arrangement as a paper guide element. By providing a dual purpose calibration/baffle member, the present invention provides a surface upon which a calibration target may be supported for scanning by the fixed scanning element. The required motion is a function of the movement of the moving scan head, thus providing movement without necessitating an additional drive assembly. Thus, the invention provides operational and cost advantages.

Figure 2:
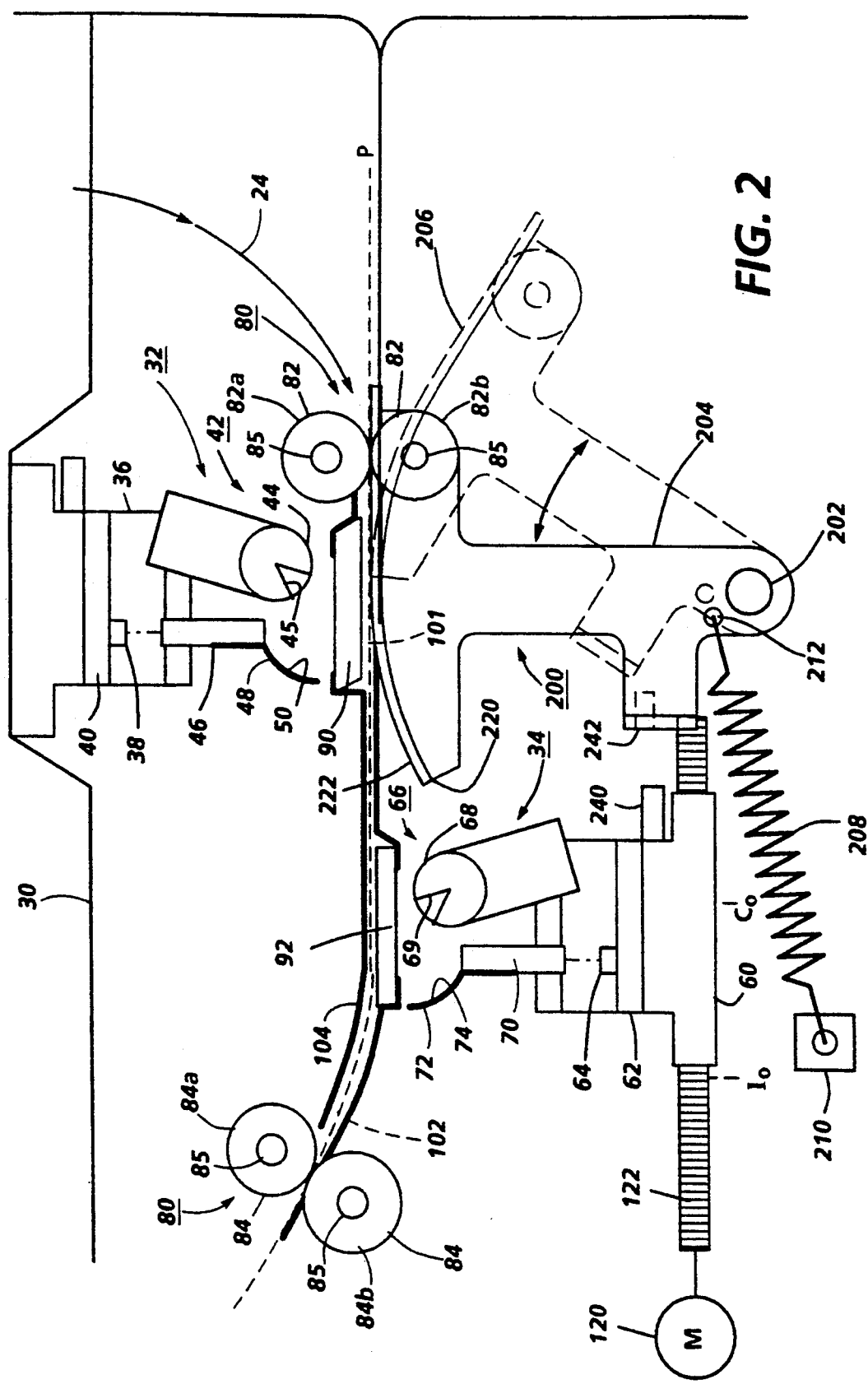

Other objects and advantages will become apparent from the following description taken together with the drawings in which:

FIG. 1 is a somewhat schematic view of an input scanning device which might incorporate the present invention; and FIG. 2 is an enlarged view of the moving document scanning station of the device in FIG. 1.

Referring now to the drawings where the showings are for the purpose of illustrating a preferred embodiment of the invention and not for limiting same, FIG. 1 shows an input scanner 10 in accordance with the invention for generating an electronic representation of an image on a document. As used hereinafter, "document" refers to an image bearing original from which copying is desired. Documents may comprise image supporting substrates, such as cut sheets of paper, transparencies or other individual pieces of flimsy material, unburst computer forms forming a continuous length of material, or any image bearing substrate from which copying is desired. When necessary, the type of document for which the description finds use will be described with greater particularity. "Image" as used herein, referes to the visible information on the document, for which scanning is desired, and which will be in some manner copied to another substrate or to an electronic storage medium. "Scanning" as used hereinafter, refers to the relative movement of photosensitive sensors with respect to documents for the purpose of acquiring an electronic representation of the image or information about the image.

Input scanner 10 may be comprised of upper and lower frame members 12 and 14. Upper and lower frame members 12 and 14 may be generally rectangular box-shaped members, connected by a hinge member (not shown) along lower and upper rear edges of frame members 12 and 14, respectively. Upper and lower frame members 12 and 14 are separable in a clam shell fashion at the hinge member to allow access to the area thereinbetween as will hereinafter be described.

Upper frame member 12 is provided with a document input tray 20 for holding a stack of documents D such as cut sheets of paper face-up in the document tray from which data acquisition is desired. Document input tray 20 is provided with a document feeder 22 for feeding documents D out from document input tray 20. In a preferred embodiment of the invention, document feeder 22 may be a well-known top feeding vacuum corrugated feeder found in standard document feeders for light-lens type copiers for feeding documents in a 1-N order. Document input tray 20 may also be upwardly biased or provided with a tray elevator (not shown) to provide documents D in position for feeding.

Documents D are directed by document feeder 22 to an input sheet path 24 to be directed to a scanning position. Along sheet path 24, documents D are driven along by nip roll 26, comprising a pair of rubber rollers which drive the documents in a forward direction along the sheet path 24. A second nip roll 28 may advantageously comprise a cross roll deskewing nip to provide documents in a desired registered position before entering the scanning station. A drive motor (not shown) is provided for driving the document feeder, and drive rollers in the nips, as well as the other driving elements of input scanner 10.

With reference now to FIGS. 1 and 2, documents D are driven along input sheet path 24 into scanning station 30. Scanning station 30 is comprised of upper and lower scanning elements 32 and 34. Upper scanning element 32 is fixed in position with respect to sheet path 24, and comprises an upper scanning element frame generally indicated as 36. Frame 36 extends transversely across, above and generally parallel to the path of document travel along sheet path 24, for the support of a scanning array for scanning a document passing thereunder. On an upper portion of frame 36, scanning array 38 is supported on scanning array support member 40, transverse and parallel to the path of sheet travel thereby for scanning documents. Scanning array support member 40 is a relatively rigid member fixed to the frame 36 by fasteners or adhesives, and supporting scanning array 38 in position across the path of document travel, without sagging or twisting which could cause imaging imperfections. Scanning array 38 may be a linear array of photosensitive sensors such as CCD's or photodiodes which are controlled to sense light reflected from documents during an integration period. The photosensitive sensors develop an electrical response of the amount of light detected, for transmission to an image processor for use in assimilating an electronically stored representation of the image on the document. In a preferred embodiment of the invention, the array may comprise several smaller arrays butted at their ends to each other to form an unbroken array, extending the full width of the document to be scanned as described in U.S. Pat. No. 4,604,161 to Araghi, although other sensor array arrangements are possible, including staggered smaller arrays electronically stitched to give the result of a continuous array.

With reference to FIG. 2, documents directed past scanning element 32 are illuminated by a lamp assembly supported on frame 36 and comprising lamp 42, and lamp cover 44 having aperture 45 engaged to a power supply (not shown) and directing light towards the document to be scanned. Light from the illuminated document is reflected to lens 46, comprising a bundle of image transmitting fiber lenses produced under the trade name of "SELFOC" by Nippon Sheet Glass Company Limited, provided to direct light reflected from the document to scanning array 38. Adjacent to the portion of lens 46 closest to the document is a reflector member 48, extending generally towards the document which may be advantageously provided with a light reflecting concave surface 50 to further aid in directing light from lamp 42 to illuminate the document. It will, of course, be appreciated that other optical and illuminating systems may be used to illuminate and direct light from the document to the scanning array 38.

Lower scanning element 34 is provided as a mirror image of scanning element 32, including frame 60, scanning array support member 62, scanning array 64, lamp assembly including lamp 66 and lamp cover 68 having aperture 69, lens 70 and reflector member 72 having a reflective surface 74. The primary difference between the two scanning elements is that the lower scanning element 34 is arranged in a position opposing that of upper scanning element 32, in order to scan images on a side or face of the document opposite to that scanned by the upper scanning element 34. Accordingly, images on the upper face of documents, passing through the scanning station 30 are illuminated and scanned by upper scanning element 32, while images on the lower face of the document are illuminated and scanned by the lower scanning element 34. In practice, it is preferable to have the elements slightly offset from one another so that the illumination provided for scanning one side of the document does not cause shadows detectable by the sensors in the scanning arrays to show through the documents.

Documents entering the scanning station are driven into and through the station by a four roll Constant Velocity Transport (CVT) arrangement 80 comprising upstream and downstream sets of rolls 82 and 84 located at the entry and exit to the scanning station, respectively. Each nip roll pair is comprised of upper idler rolls 82a and 84a and lower drive rolls 82b and 84b. Drive rolls 82b and 84b are driven by a motor (not shown) through a timing belt arrangement that maintains the speed of the rolls and accordingly, the speed of documents moved by the rolls at a carefully controlled constant velocity. Downstream rolls 84 are located above the imaging plane P so as to not interfere with movement of lower scanning element 34.

Sheets transported through scanning station 32 are directed between platen glass members 90 and 92 supported respectively on upper and lower frame members 12 and 14 which serve to maintain flatness in documents advancing therethrough for scanning. The platen glass members 90 and 92 are each about 4 mm thick, for support of the document as it passes through the scanning station, and are supported at slightly offset positions, corresponding to the relationship of the upper and lower scanning elements. At scanning station 32, a document is biased against a single platen glass member by a baffle member 200, which will be described further hereinafter, to obtain the required flatness while the document passes through the scanning station.

As documents are advanced through scanning station 30, photosensitive sensors on scanning arrays 38 and 64 are exposed to light reflected from the document to derive an electronic representation of the image thereon for transmission to an image processing or storage device. In a preferred embodiment of the invention, for duplex documents, image information from each side of the document is derived and transmitted alternately by each respective array. Thus, for example, while array 38 is deriving image information, array 64 may be transferring previously derived image information out of the array.

With reference again to FIG. 1, upon leaving the scanning station 32, documents are driven by the CVT through sheet path 95 wherealong documents are driven by nip roll pairs 96, 98 and 99 into an output tray 102. The passage of documents along the described sheet path, having a generally U-shape, with a single fold, and feeding the documents in the input tray 20 from the top of the input stack, provides a single natural inversion of the documents, so that they are arranged face down in output tray 102 in the same order that they were originally provided. In a preferred embodiment of the invention, the output tray may be a simple low energy uphill stacking tray without requirement for mechanical document handling therein. While an arrangement providing a document handler recirculating the documents back to an input tray is certainly possible, there is no need for the expensive and complicated mechanical document handling in those devices, since there is no need to repeatedly present the document for copying as in a light lens copier. Both sides of the document may be read simultaneously, and the image information stored for copying as desired in an electronic storage medium.

Lower scanning element 34, normally arranged closely adjacent to scanning element 32, is also supported for reciprocating scanning movement, as will be described hereinafter, on support rails 110. Support rails 110 are provided in lower frame portion 14, parallel to the direction of document travel of sheet travel through scanning station 30, and located, in a preferred embodiment, generally on either side of the path of sheet travel. In FIG. 1, only a single support rail 110 is shown, but usually at least two will be provided. Scanning element 34 may be provided with bearings or bushings to reduce sliding friction between scanning element 34 and the rails 110. Rails 110 support the scanning element 34 for movement across the length of lower frame portion 14 slightly below a scanning platen 112. Scanning platen 112 is a generally rectangular member having a size allowing the placement of documents thereon for scanning by the scanning element 34 as it moves across the length of the lower frame 14. Scanning platen 112 is supported at its edges on lower frame 14. Scanning platen 112 supports documents not readily fed from document input stack 20, such as pages of books, single sheets in bound documents, documents too thick, fragile or damaged to be fed along paper paths 24 and 100, or objects having surfaces or profiles desired to be copied. On selection of platen copying, i.e., copying of images from a document placed on scanning platen 112, lower scanning element 34 moves from an initial position $I_o$ fixed with respect to upper scanning element 32, and generally adjacent a first end of the scanning platen 112, across the length of lower frame 14 and scanning platen 112 in the direction of arrow 114 to a start of scan position $S_o$ at the opposite end of the scanning platen. In a preferred embodiment, during the movement of the scanning element 34 to position $S_o$, the scanning array is generally inoperative for acquiring image data, although it is well within contemplation of the invention to either scan the document for image information, or to provide a pre-scan operation which allows a fast, gross scanning operation to drive an appropriate contrast level, or threshold information for use by the image processing device. Image scanning is preferably accomplished by movement of the lower scanning element from position $S_o$ back to position $I_o$ in the direction indicated by the arrow 116. Conveniently, lower scanning element 34 is driven in its scanning motion by a lead screw driven arrangement, comprising a motor 120 driving a lead screw 122, supported at motor 102, and housing 14 (bearing support on housing 14 not shown).

In accordance with the invention and as illustrated in FIG. 2, for calibration and service purposes, calibration/baffle member (hereinafter, baffle member) 200 is supported within and on housing 14 at axle 202, which forms a pivot point about which the baffle rotates. The axis of rotation defined by axle 202 is parallel to the sensor array 38. While only one side of baffle member 200 is shown, it will be recognized that conveniently, baffle member 200 may be formed having a pair of parallel baffle arms 204 which together support a baffle surface 206 extending transversely across and parallel to paper path 24. Baffle member 200 is arranged so that, during normal operations, baffle surface 206 supports documents moving past the first scanning element, and against platen glass 90 to maintain required flatness. Baffle member 200 is biased to a first normal operation position by a biasing arrangement, which in one possible embodiment is a spring 208, having one end connected to housing anchor 210 on housing 14, and the other end connected to baffle anchor 212, on one of the baffle arms 204, in order to generally bias baffle member 200, and accordingly baffle surface 206 in the direction to the lower scanning element 34. Of course, many other biasing arrangements are possible.

Baffle surface 206 is curved, with a radius allowing rotating movement of the baffle member without mechanical interference with platen 90. Adjacent to a trailing edge 220 of the baffle surface 206 a calibration target 222 is supported or printed. The actual target on surface 206 is not critical, but typically comprises at least a black target, and a white target. The black target is used as a reference by the image processing electronics to determine sensor offset levels and flare light levels. Sensor offset levels may also be determined by measuring photosite response with the lamp turned off. The white target is used to determine sensor and optical/illumination system gain. The target has a width and length selected so that every sensor in the array simultaneously detects the same target. Desirably, the targets are arranged along a sequential path of the scanning element rotation, and detected in accordance with machine requirements for diagnostics purposes. In the particular embodiment, the target in the calibration position is parallel and approximately co-extensive with the sensor array.

Baffle member 200 is supported, as described, for rotating or pivoting motion about an axis defined by axle 202. Lower scanning element 34 and the baffle member 200 are arranged to engage, during a portion of the motion of the lower scan element, as it is driven by the lead screw arrangement. In one possible embodiment, an abutment portion 240 of frame 60, which may be simply an edge of frame 60 closest to the baffle member 200, engages with a receiving portion 242 of baffle member 200. If the lead screw arrangement continues to drive lower scanning element 34, the movement thereof will drive baffle member 200 in its pivoting movement to a second position, whereat the calibration target is at a position within the field of view of the fixed scanning element 32.

Consideration the movement of the lower scanning element 34 with respect to fixed upper scan head 32, from position $I_0$ to $C_0$, and returns to $I_0$ upon completing calibration.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. An input scanner comprising:

a document input;

a stationary sheet platen;

a sheet transport for advancing documents from the document input to a scanning station and to a document output along a sheet path;

a scanning station having a first scanning element, fixed in position relative to the sheet feeding path for scanning a first face of documents advancing therepast along the sheet feeding path, and a second scanning element, supported at a home position adjacent to said first scanning element for scanning a second face of documents advancing therepast, substantially simultaneously with said first scanning element, and for movement past the stationary platen, each scanning element including an array of photosensitive sensors with a corresponding optical arrangement for illuminating a document and directing light from the document to the sensors;

a calibration/baffle member including a baffle surface, a portion thereof supporting a calibration target, said baffle member supported to allow movement of said baffle surface between first and second positions, said first position biasing documents towards said first scanning element, and said second position supporting said calibration target at a position for scanning by said first scanning element;

means for biasing said baffle member towards said first position;

drive means for moving said second scanning element in scanning movement along a predetermined scanning path and selectively operative in a calibration mode to move said second scanning element along said scanning path into contact with the calibration/baffle member to move said member in a direction opposite to the bias of the biasing member to the second position.

2. A device as defined in claim 1, wherein a first biasing means is a spring, biasing said calibration/baffle member towards the first position.

3. An input scanner comprising:
- a housing;
- a stationary sheet platen supported at an exterior surface of said housing to support documents in a stationary position for scanning;
- a document input supported on an exterior surface of the housing;
- a document output supported on an exterior surface of the housing;
- a sheet transport supported within the housing and advancing documents from the document input past first and second scanning elements and to a document output along a sheet path;
- said first scanning element, fixed in position relative to the sheet feeding path, for scanning a first face of documents advanced therepast along the sheet path;
- a second scanning element, supported for movement within the housing, said scanning element supported at a home position adjacent said first scanning element for scanning a second face of documents advancing therepast, and supported for movement past the stationary sheet platen;
- said scanning elements each including an array of photosensitive sensors and a corresponding arrangement for illuminating a document, directing light from the document to the sensors, and producing an electrical response representative of sensed light;
- drive means for selectively moving said second scanning element in scanning movement along a predetermined scanning path, including said home position, said stationary platen and a calibration position;
- a calibration/baffle member including a baffle surface, a portion thereof supporting a calibration target, said baffle member supported in said housing to allow movement of the baffle surface between first and second positions, said first position biasing documents towards said first scanning element, said second position supporting the calibration target at a position for calibrating said sensor response; and
- said calibration/baffle member supported in the predetermined scanning path, for selective contact with the second scanning element therealong, to move the calibration/baffle member from the first position towards said second position.

* * * * *